United States Patent
Erdogan et al.

(10) Patent No.: US 9,434,145 B2
(45) Date of Patent: Sep. 6, 2016

(54) DICHROIC FILTER CONFORMED TO OPTICAL SURFACE

(71) Applicant: Semrock, Inc., Rochester, NY (US)

(72) Inventors: Turan Erdogan, Spencerport, NY (US); Prashant Prabhat, Rochester, NY (US); Nicholas G. Traggis, Boulder, CO (US)

(73) Assignee: Semrock, Inc., Rochester, NY (US)

( * ) Notice: Subject to any disclaimer, the term of this patent is extended or adjusted under 35 U.S.C. 154(b) by 591 days.

(21) Appl. No.: 13/708,310

(22) Filed: Dec. 7, 2012

(65) Prior Publication Data

US 2014/0158274 A1 Jun. 12, 2014

(51) Int. Cl.
- B32B 37/14 (2006.01)
- G02B 5/28 (2006.01)
- B32B 37/00 (2006.01)

(52) U.S. Cl.
CPC ............... *B32B 37/14* (2013.01); *G02B 5/285* (2013.01); *B32B 2037/0092* (2013.01); *B32B 2307/40* (2013.01); *Y10T 156/10* (2015.01)

(58) Field of Classification Search
CPC ................................. G02B 5/28; B32B 37/14
USPC ......................................................... 156/60
See application file for complete search history.

(56) References Cited

U.S. PATENT DOCUMENTS

| | | | |
|---|---|---|---|
| 3,880,632 A | 4/1975 | Podvigalkina | |
| 4,679,918 A * | 7/1987 | Ace | G02C 7/02 351/159.62 |
| 4,810,318 A | 3/1989 | Haisma et al. | |
| 4,883,215 A | 11/1989 | Goesele et al. | |
| 5,243,465 A | 9/1993 | Fein | |
| 5,724,185 A | 3/1998 | Hickey et al. | |
| 5,785,874 A | 7/1998 | Eda | |
| 5,846,638 A | 12/1998 | Meissner | |
| 5,915,193 A | 6/1999 | Tong et al. | |
| 6,284,085 B1 | 9/2001 | Gwo | |
| 6,542,219 B2 | 4/2003 | Braat et al. | |
| 6,548,176 B1 | 4/2003 | Gwo | |

(Continued)

FOREIGN PATENT DOCUMENTS

| | | |
|---|---|---|
| EP | 1829846 A1 | 5/2007 |
| WO | WO 01/32580 A2 | 5/2001 |

OTHER PUBLICATIONS

Tong, Q-Y and Gosele, U., Semiconductor Wafer Bonding: Science and Technology, John Wiley & Sons, Inc., 1999, pp. 54-67.

(Continued)

*Primary Examiner* — Jeff Aftergut
(74) *Attorney, Agent, or Firm* — Louis S. Horvath

(57) ABSTRACT

A method for forming an optical element deposits a first thin film coating to form a first coated surface on a first transparent substrate that is substantially flat, wherein, for incident light at an angle of incidence exceeding 5 degrees, the first multilayer thin film coating transmits a first wavelength band and reflects a second wavelength band. The first coated surface has a first surface form, and further has a second surface opposite the first coated surface with a second surface form. The second surface of the first substrate bonds to a third surface of a second transparent substrate to form the optical element. The third surface has a third surface form prior to bonding and the first coated surface has a fourth surface form after bonding. The difference between the fourth and the third surface forms is less than the difference between the first and third surface forms.

19 Claims, 16 Drawing Sheets

(56) References Cited

U.S. PATENT DOCUMENTS

| | | | |
|---|---|---|---|
| 6,652,972 | B1 | 11/2003 | Conzone et al. |
| 6,749,427 | B1 | 6/2004 | Bretscher et al. |
| 6,814,833 | B2 | 11/2004 | Sabia |
| 6,836,602 | B2 | 12/2004 | Filhaber et al. |
| 6,911,375 | B2 | 6/2005 | Guarini et al. |
| 6,959,854 | B2 | 11/2005 | Yokokawa et al. |
| 7,068,430 | B1 | 6/2006 | Clarke et al. |
| 7,208,060 | B2 | 4/2007 | Conzone et al. |
| 7,396,741 | B2 | 7/2008 | Mund et al. |
| 7,608,520 | B2 | 10/2009 | Sugita et al. |
| 2006/0225638 | A1 | 10/2006 | Hauke et al. |
| 2009/0294017 | A1 | 12/2009 | Traggis et al. |
| 2009/0294050 | A1 | 12/2009 | Traggis et al. |
| 2009/0294051 | A1 | 12/2009 | Traggis et al. |

OTHER PUBLICATIONS

Reid, S.; Cagnoli, G.; Rifle, E.; Faller, J.; Hough, J.; Martin, I.; Rowan, S.; "Influence of temperature and hydroxide concentration on the settling of hydroxy-catalysis bonds", Physics Letters A, vol. 363, Apr. 9, 2007, pp. 341-345.

Fox, Richard W., "Fabry-Perot temperature dependence and surface-mounted optical cavities", SPIE Proceedings of Photonics North 2008 Conf., Montreal, Jun. 2008. pp. 1-8.

Shaddock, D.A.; Young, B.C.; Abramovici, A; "Bench Top Interferometric Test Bed for USA", Astronomical Telescopes and Instrumentation, 2002.

Simpson, Robert D., Hayden, Joseph S. and Conzone, Samuel D. ; "Hybrid glass structures for telecommunication applications", Proc. SPIE 4640, Integrated Optics: Devices, Materials, and Technologies VI, 29 (Jun. 18, 2002), pp. 29-36.

Haisma, Jan, et al., "Diversity and Feasibility of Direct Bonding; a Survey of a Dedicated Optical Technology". Applied Optics, (1994) V.33 No. 7, pp. 1154-1169.

NASA's Jet Propulsion Laboratory, "Hydroxide-Assisted Bonding of Ultra-Low-Expansion Glass", 1 page.

Jan Haisma, Nico Hattu, J. T. C. M. (Dook) Pulles, Esther Steding, and Jan C. G. Vervest; "Direct bonding and beyond" (Doc. ID 80583); Applied Optics_vol. 46, No. 27_Sep. 20, 2007, pp. 6793-6803.

Jan Haisma, "Direct Bonding in Patent Literature", Philips Journal of Research vol. 49 No. I/2 1995, pp. 165-170.

Plossl, Andreas; Krauter, Gertrud, "Wafer direct bonding: tailoring adhesion between brittle materials" Materials Science and Engineering Reports, vol. 25, Issues 1-2, Mar. 1999, pp. 1-88.

Preston, Alix, Balaban, Benjamin, Mueller, Guido; "Hydroxide-Bonding Strength Measurements for Space-Based Optical Missions" Int. J.Sppl. Ceram. Technol.,5 [4] pp. 365-372 (2008).

U. Gosele, H. Stenzel, M. Reiche, T. Martini, H. Steinkirchner and Q-Y Tong; "History and Future of Semiconductor Wafer Bonding", Solid State Phenomena vols. 47-48 (1996) pp. 33-44.

H.W. Park, et al. "A Low Temperature Direct Bonding Method Using an Electron-Beam Evaporated Silicon-Oxide Interlayer." Mat. Res. Soc. Symp. Proc. vol. 444 (1997).

M. Shimbo, K. Furukawa, K. and K. Tanzawa; "Silicon-to-silicon direct bonding method", 1986 Journal of Applied Physics, vol. 60, Oct. 15, 1986, p. 2987-2989.

Akira Sugiyama, Hiroyasu Fukuyama, Tsuneo Sasuga, Takashi Arisawa, and Hiroshi Takuma "Direct Bonding of Ti Sapphire Crystals", Optical Society of America, Applied Optics, vol. 37, Issue 12, pp. 2407-2410 (1998).

Howlader, M. M. R., Suehara, Satoru. "Room temperature wafer level glass/glass bonding", Sensors and Actuators, A, Physical, vol. 127, issue 1, Feb. 2006, pp. 31-36.

Gerhard Kalkowski, Mathias Rohde, Stefan Risse, Ramona Eberhardt, and Andreas Tunnermann; "Direct bonding of glass substrates", The Electrochemical Society, Meet. Abstr. 2010 MA2010-02(27): 1707.

\* cited by examiner

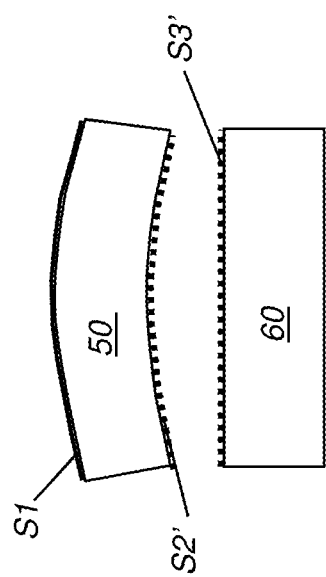

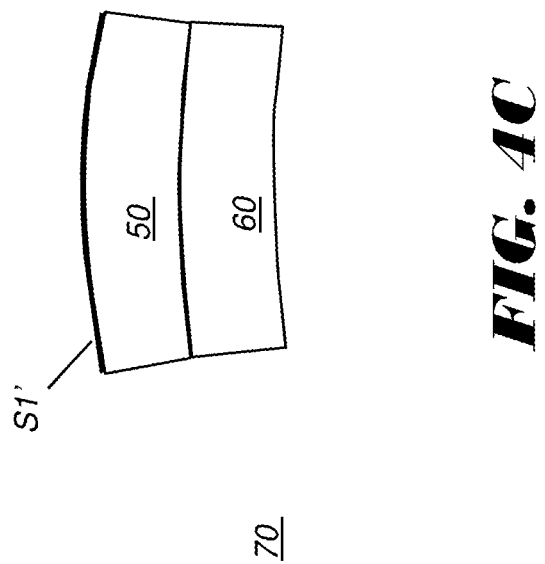

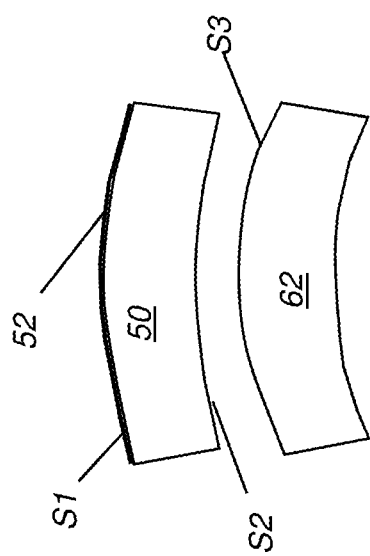

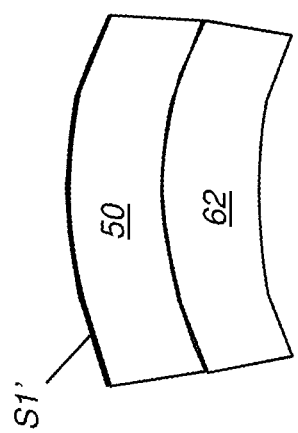

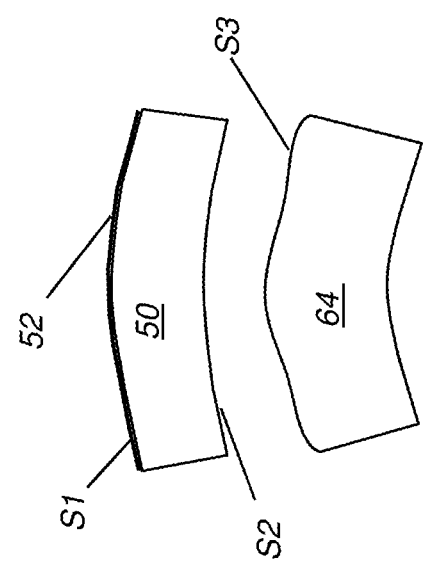

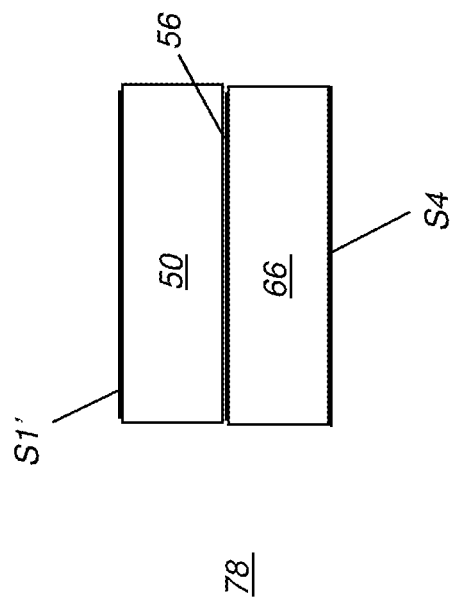

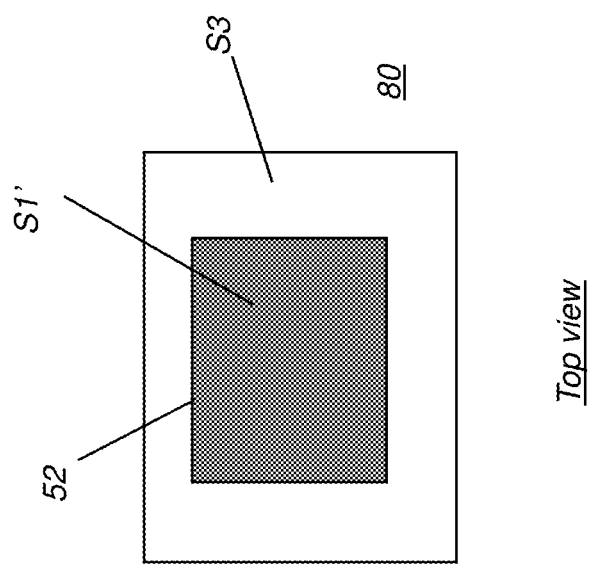

DICHROIC FILTER CONFORMED TO OPTICAL SURFACE

FIELD OF THE INVENTION

This invention generally relates to thin film optical filters and more particularly to methods for providing a thin film optical filter that conforms to a desired surface form.

BACKGROUND OF THE INVENTION

Thin film interference filters are widely used in systems for optical measurement and analysis, such as Raman spectroscopy and fluorescence imaging, for example. Thin film interference filters, including optical edge and band pass filters, notch filters, and laser line filters (LLFs) are advantageously used in such systems to transmit light having specific wavelength bands and to reflect other light, including light that could otherwise constitute or generate spurious optical signals and swamp the signals to be detected and analyzed. Dichroic beam splitters utilize interference filter effects to reflect certain wavelengths or ranges of wavelengths and transmit other wavelengths or ranges of wavelengths. Failure or poor performance of such filters compromises the performance of systems in which they are used. Conventional design approaches for optical instruments that utilize thin-film filters are often constrained by inherent characteristics of these filters and long-standing practices for how these filters are designed and used.

As an example of one type of system that relies heavily on thin-film filters and benefits from high performance filter design, the simplified schematic diagram of FIG. 1 shows one type of imaging apparatus that is used for analysis of spectral characteristics of a sample. A fluorescence microscopy system 10 has a light source 12 with an illumination lens L2 that directs a beam of excitation energy, within a specific wavelength range, toward a sample 20 for analysis. Optical fluorescence occurs when absorption of light of the excitation wavelength(s) causes emission of light at one or more longer wavelengths. A succession of filters 22, 24, and a dichroic beam splitter 26 are used to isolate and direct the different wavelength bands of excitation and emitted light, respectively, to and from sample 20. The image-bearing emitted light from the sample is split into two components using a beam splitter 32 that is disposed in the path of this light at a 45-degree angle. Beam splitter 32 reflects a first wavelength band through a filter 38 and a lens L5 to a first detector 30a to form a first image. Beam splitter 32 also transmits a second wavelength band through a filter 36 and a lens L6 and to a second detector 30b to form a second image. Detectors 30a and 30b can be any of a number of light-sensing devices, such as a camera or charge-coupled device (CCD).

The surface flatness of dichroic beam splitters 26 and 32 affects a number of factors in the performance of fluorescence microscopy system 10. For light incident at high angles of incidence, such as the 45 degree angle of incidence (AOI) of a dichroic surface, the beam axis for transmitted light can be slightly laterally shifted relative to the axis of incoming light to the surface. Furthermore, if both surfaces of the dichroic are appreciably curved, such that the dichroic has the shape of a bent parallel plate, the beam axis for transmitted light can be slightly diverted and therefore non-parallel to the axis of incoming light to the surface. Light reflected from the tilted surface, however, presents even more of a problem. For example, unless the reflective surface is flat to within close tolerances, the focus of the excitation beam from light source 12 can be shifted along the axis away from the focal plane of the focusing lens and the size of the focused point can be compromised. Similarly, the focal plane of the emitted light that is reflected by beam splitter 32 can be shifted along the axis of light away from detector 30a and the image can be distorted.

There can be additional problems related to flatness with specific types of microscopy systems as well. For example, for a type of laser based fluorescence microscopy termed Total Internal Reflection Fluorescence or TIRF microscopy, the laser beam needs to be focused at the back focal plane of the objective lens L1. In yet another fluorescence microscopy technique, termed Structured Illumination microscopy, there is a grid pattern in the light path between lens L2 and filter 22. This grid pattern needs to be imaged onto sample 20, as shown in FIG. 1. For both TIRF and Structured Illumination microscopy, the relative flatness of the dichroic surface that corresponds to beam splitter 26 affects how well the measurement apparatus performs. Similarly, if there is unwanted curvature of dichroic beam splitter 32, one or both of these problems can easily occur: (1) the position of the focal plane shifts and (2) the size or shape of the focused spot changes. Either of these two effects, or their combined effect, can significantly compromise the image quality of detector 30a. Aberrations resulting from this focal shift and degradation may not be easy to correct and can adversely affect the overall imaging performance of the microscopy system.

Imperfect flatness can be a particular problem when using dichroic beam splitters with laser light, whether in microscopy or in other applications. For this reason, dichroic surfaces rated for use with lasers must meet higher standards for flatness and are more costly than dichroic surfaces that are used for other light sources.

Dichroic coatings are typically formed by thin film deposition techniques such as ion beam sputtering. These fabrication methods require deposition onto a flat substrate, but tend to add significant amounts of mechanical stress as they are applied. This stress, if not corrected in some way, can cause some amount of bending or warping of the underlying substrate, frustrating attempts to maintain suitable flatness. For this reason, many types of commercially available dichroic beam splitters encase the dichroic coating within a prism. Encasement solutions, however, present other problems, including practical difficulties in alignment, the need for optical adhesives that can both withstand the optical and temperature environment while closely approximating the refractive index of the surrounding glass, and other shortcomings. The dichroic coating works best when it is disposed directly in the path of incident light; encasing the coating within glass or other substrate introduces optical problems, such as absorption and scattering, that can degrade optical performance.

Another inherent shortcoming of conventional thin-film deposition techniques used for forming a dichroic coating relates to limitations of the needed surface flatness for accurate deposition. It can be very challenging, and in many cases, can be impractical to apply a dichroic coating to a surface having any appreciable curvature. This constrains dichroic coatings from being readily applied to lenses, mirrors, and other non-plano surfaces.

Thus, there would be advantages to methods that would allow additional control of surface flatness as well as allowing conformance of dichroic filters to non-plano surfaces.

SUMMARY OF THE INVENTION

It is an object of the present invention to advance the art of optical filtering. With this object in mind, the present invention provides a method for forming an optical element, the method comprising:

depositing a first multilayer thin film coating to form a first coated surface on a first transparent substrate that is substantially flat, wherein, for incident light at an angle of incidence exceeding 5 degrees, the first multilayer thin film coating has a filter characteristic that transmits light of a first wavelength band and reflects light of a second wavelength band, wherein the first coated surface has a first surface form, and wherein the first substrate further has a second surface that is opposite the first coated surface, wherein the second surface has a second surface form after the coating is deposited; and bonding the second surface of the first substrate to a third surface of a second transparent substrate to form the optical element, wherein the third surface has a third surface form prior to bonding and wherein the first coated surface of the optical element has a fourth surface form after bonding, wherein the difference between the fourth surface form and the third surface form is less than the difference between the first surface form and the third surface form.

Additional features and advantages will be set forth in part in the description which follows, being apparent from the description or learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the embodiments, as claimed.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 4B is a side view showing components of FIG. 4A following surface treatment for bonding.

FIG. 4C is a side view that shows an optical element formed by bonding a second substrate to the substrate of the dichroic filter as fabricated.

FIG. 5A is a side view showing components of an optical element for modifying the surface form of a dichroic coating, wherein the second substrate has a curvature.

FIG. 5B is a side view that shows an optical element formed by bonding the second substrate of FIG. 5A to the substrate of the dichroic filter as fabricated.

FIG. 6A is a side view showing components of an optical element for modifying the surface form of a dichroic coating, wherein the second substrate has an aspheric surface.

FIG. 7B is a side view that shows an optical element formed by bonding the second substrate of FIG. 7A to the substrate of the dichroic filter as fabricated.

FIG. 8B is a top view of an optical element formed by bonding the second substrate of FIG. 8A to the substrate of the dichroic filter as fabricated.

DETAILED DESCRIPTION OF THE INVENTION

Figure 1:
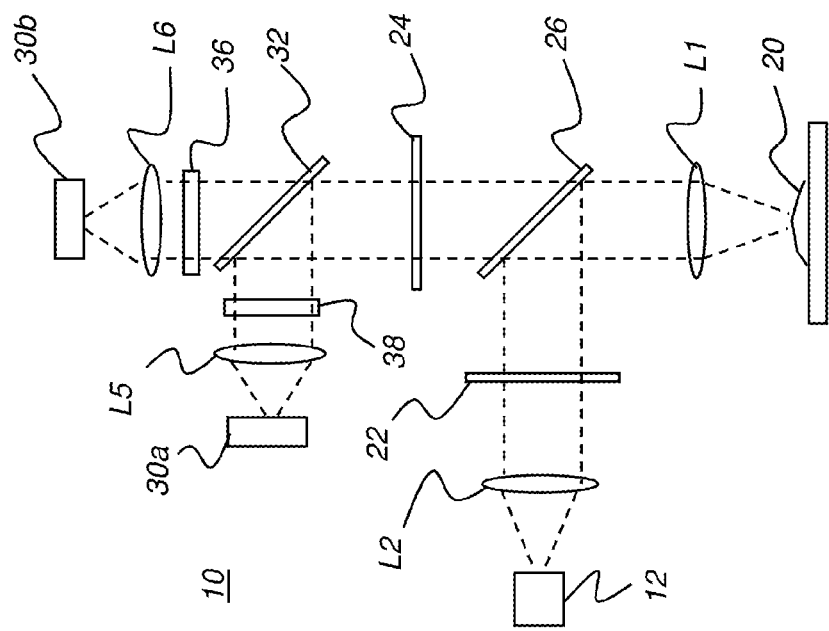
FIG. 1 is a schematic diagram showing optical paths within a fluorescence microscope.

It is to be understood that elements not specifically shown or described herein may take various forms well known to those skilled in the art. Figures shown and described herein are provided in order to illustrate key principles of operation and component relationships along their respective optical paths according to the present invention and are not drawn with intent to show actual size or scale. Some exaggeration has been necessary in order to more clearly emphasize surface form features such as unwanted curvature and to more clearly show basic structural relationships or principles of operation.

Where they are used, the terms "first", "second", "third", "fourth", and so on, do not necessarily denote any ordinal or priority relation, but are simply used to more clearly distinguish one element from another.

The term "oblique" is used herein to refer to an angular relationship that is other than substantially orthogonal or parallel, that is, at least about 5 degrees from any integer multiple of 90 degrees.

In the context of the present disclosure, the terms "configured", "coated", or "formed" are used equivalently with respect to the fabrication of thin film filters designed to provide a particular spectral characteristic, also termed a "filter characteristic" in the context of the present invention. A surface is considered to be transmissive to a particular wavelength if it transmits at least 75 percent of the light that is incident at that wavelength. A surface is considered to reflect a given wavelength of incident light if it reflects at least 80 percent of the light that is incident at that wavelength.

The term "wavelength band" has its conventional meaning as is readily understood by those practiced in optical design, and refers to a continuous span of the electromagnetic spectrum that covers a continuous range of wavelengths.

In the context of the present disclosure, the term "surface figure" or "surface form" has its conventional meaning, as is understood by those who are skilled in the optical design arts and as defined in international standard ISO 10110-5 entitled "Optics and Photonics—Preparation of drawings for optical elements and systems, part 5: Surface form tolerances".

In conventional practice, as used by fabricators and providers of optical components, surface figure or surface form for a particular optical surface relates to two characteristics:
  (i) sagitta deviation, based on a best-fit sphere to the surface shape; and
  (ii) irregularity, typically expressed in terms of RMS (root-mean squared) deviation from ideal conformance to the intended surface shape.

In optical specifications that conform to ISO 10110 nomenclature, surface figure or surface form can be expressed in the form:

$$3/A(B)$$

wherein the "3" is the ISO code number assigned to designate surface form tolerance; variable "A" represents the sagitta deviation; variable "(B)" represents surface irregularity. The component A and B values of the surface form are variously expressed by manufacturers or by those skilled in optical design in dimensions defined in ISO 14999-4:2007, that is, in terms of fringe spacings or in nanometers. Often, the A and B values are expressed less formally, in terms of wavelengths or fractions of a wavelength based on fringe spacing measurements, such as $\lambda$, $\lambda/4$, $\lambda/10$ for the predetermined wavelength, for example. Surface form is measured at a predetermined wavelength, generally at a wavelength that lies within the range of light intended for the optical system, and applies for flat, spherical, and aspherical surfaces.

In the context of the present disclosure, the calculated or computed difference between surface forms for two surfaces is expressed in terms of magnitude, that is, as an absolute value (positive number). For two surfaces used in an optical assembly or device, the difference between their respective surface form values is computed using simple subtraction of the respective sagitta deviation or "A" values or respective irregularity or "B" values from each other, and then expressing this difference as the absolute value of this result. Regardless of the specific dimensional units that are used (fringe spacings, nm, or fractional wavelengths), a relatively small calculated difference value indicates close conformance of two surfaces to the same overall shape (A) and/or irregularity (B); a relatively larger difference value indicates poor conformance of two surfaces to the same sagitta deviation (A) and/or irregularity (B).

In the context of the present disclosure, the surface figure or surface form of each optical surface in an optical assembly is given as Zn wherein Z can refer to either the A value for sagitta deviation or the B value for surface irregularity and n refers to a specific surface in the assembly. The calculated difference in surface form between two surfaces a and b is expressed simply in absolute value form:

$$|Za-Zb|$$

wherein either Za is the sagitta deviation for surface a and Zb is the sagitta deviation for surface b, or Za is the irregularity for surface a and Zb is the irregularity for surface b.

In the context of the present disclosure, curvature is quantified according to a radius of curvature. A perfectly flat surface has a radius of curvature of infinity. A flat filter surface of imaging-grade quality has a radius of curvature that typically exceeds about 100 meters (100 m). A flat filter surface of laser-grade quality has a radius of curvature that typically exceeds about 30 meters (30 m). A radius of curvature for a standard-quality dichroic surface can be in the range of about 6 meters (6 m) or more. A "substantially flat" surface has a radius of curvature of at least about 1 meter (1 m).

The background section of the present disclosure described some of the difficulties encountered in achieving good performance when using conventional dichroic filters as beam splitters, with particular reference to obtaining the desired surface curvature, quantified in terms of the value of sagitta deviation (A), and flatness or surface irregularity, quantified in terms of the irregularity (B) value. In fabricating a multilayer thin-film filter on a surface, the sagitta deviation (A) of the surface is generally increased due to the added mechanical stress caused by layer deposition. The surface irregularity (B) following thin-film layer deposition, however, is largely unchanged from that of the original surface.

The inventors have recognized that there is a need to overcome inherent surface shape problems caused by the thin-film deposition process and to provide ways to correct and compensate the shape of the multilayer thin film filter for improved optical performance and to provide increased flexibility of multilayer thin-film coatings. To address these needs, embodiments of the present invention take an alternate approach to curvature compensation or reshaping and surface irregularity correction by bonding the filter substrate to a second, underlying substrate. With careful selection of substrate surface forms, thicknesses, and bonding techniques, the multilayer thin-film filter can be reshaped from its original surface form and adapted for use in a variety of optical systems.

In the context of the present disclosure, the following terms may be used interchangeably: "dichroic filter", "filter", and "dichroic beam splitter". Embodiments of the present invention are directed primarily to dichroic filters and dichroic beam splitters that transmit at least a first wavelength band and reflect at least a second wavelength band, as described in the exemplary microscopy system of FIG. 1. It should be noted that dichroic coating characteristics can be designed to transmit or reflect multiple wavelength bands.

Figure 2:
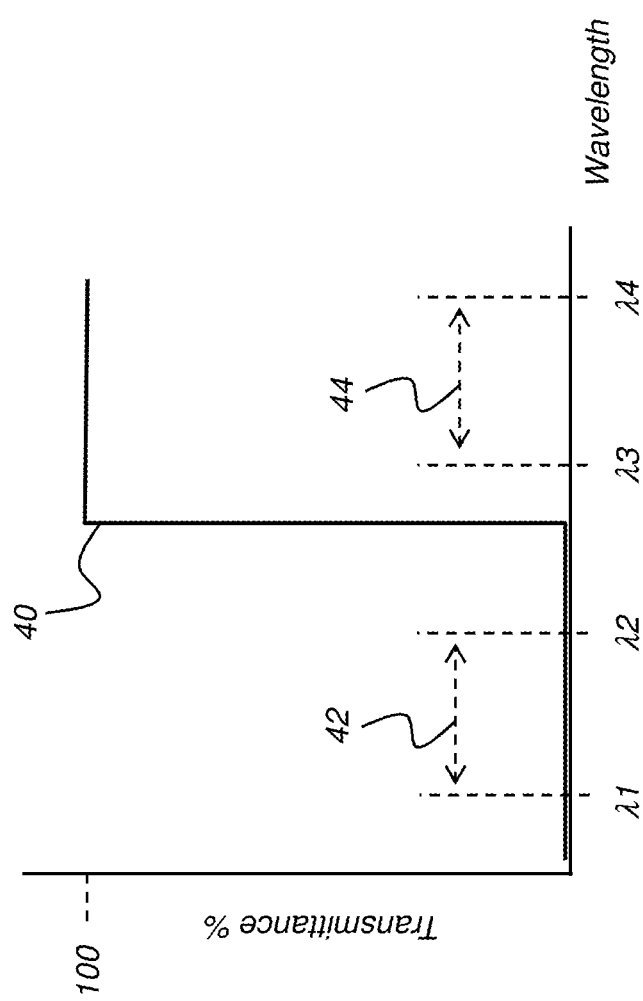
FIG. 2 is a graph that shows a filter characteristic for a dichroic surface used as a beam splitter in a fluorescence microscope or other beam splitter application.

For dichroic beam splitters, for example, the incident light is directed to the filter at an angle of incidence exceeding 5 degrees. The first and second wavelength bands are substantially non-overlapping. The idealized graph of FIG. 2 shows a filter characteristic 40 for a dichroic coating of this type. Percent transmittance is along the vertical axis (ordinate), with wavelength along the horizontal axis (abscissa). Two wavelength bands are shown. A first wavelength band 42 is defined between wavelengths $\lambda 1$ and $\lambda 2$ and is reflected by the filter having characteristic 40. A second wavelength band 44 is defined between wavelengths $\lambda 3$ and $\lambda 4$ and is transmitted.

Optical filters formed according to embodiments of the present invention generally employ the basic structure of a multilayer thin film interference filter as described in the background section. In this basic structure, a plurality of discrete layers of material are deposited onto a surface of a substrate in some alternating or otherwise interleaved pattern as a filter stack, wherein the optical index between individual layers in the filter stack can change continuously, gradually, or abruptly. In conventional thin film designs, two discrete layers are alternated, formed with thicknesses very near the quarter-wavelength thickness of some fundamental wavelength. In embodiments of the present invention, the same basic pattern can be used, as well as the addition of a third or other additional materials in the thin film stack, as needed to fine-tune filter response.

A wide variety of materials may be used to form the plurality of discrete material layers in the filter stack. Among such materials, non-limiting mention is made of metals, metallic and non-metallic oxides, transparent polymeric materials, and so-called "soft" coatings, such as sodium aluminum fluoride ($Na_3AlF_6$) and zinc sulfide ($ZnS$). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum trioxide ($Al_2O_3$).

In some embodiments, the plurality of interleaved material layers may include at least two distinct materials. As a non-limiting example, the filters according to the present disclosure may include a plurality of distinct alternating $Nb_2O_5$ and $SiO_2$ layers that have indices of refraction of 2.3 and 1.5, respectively. Alternatively, the filters in accordance with the present disclosure may use an interleaved pattern with at least three distinct materials, such as distinct $Nb_2O_5$, $SiO_2$, and $Ta_2O_5$ layers, each layer having a characteristic index of refraction. Of course, more than three materials and other combinations of materials may also be used within the interleaved layer pattern.

Generally, the filters in accordance with the present disclosure can be manufactured using deposition methods and techniques that are known in the art. For example, these filters may be made with a computer-controlled ion beam sputtering system, such as the one described in commonly assigned U.S. Pat. No. 7,068,430, entitled "Method of making highly discriminating optical edge filters and resulting products" to Clarke et al., which is incorporated herein by reference. In general, such a system is capable of depositing a plurality of discrete alternating material layers, wherein the thickness of each layer may be precisely controlled. According to an alternate embodiment of the present invention, material properties may change gradually, providing a rugate filter.

Filter designs in accordance with the present disclosure may be produced by known thin-film filter design techniques. For example, these filter designs may be produced by optimizing the filter spectra and structure of an initial design, such as a traditional short wave pass or long wave pass interference filter, against a target spectrum using known optical optimization routines. Non-limiting examples of such optimization routines include the variable-metric or simplex methods implemented in standard commercial thin-film design software packages, such as TFCalc by Software Spectra, Inc. of Portland, Oreg., and The Essential Macleod by Thin Film Center, Inc., of Tucson, Ariz. A detailed description of filter design techniques that can be used to produce filter designs according to the present disclosure may be found in the above-cited U.S. Pat. No. 7,068,430, which is incorporated herein by reference.

Figure 3:
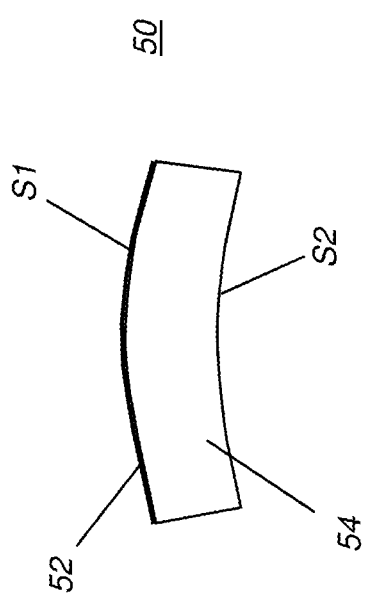
FIG. 3 is a side view showing, in exaggerated form, a thin film dichroic filter with excessive curvature.

As noted previously in the background section, mechanical stress caused during layer deposition onto a filter substrate can cause some amount of warping and distortion and degrade the flatness of the substrate surface. The side view of FIG. 3 shows, in exaggerated form, a dichroic filter 50 formed as a multilayer thin-film coating 52 on a transparent substrate 54. Substrate 54 can be glass, crystal, or other suitable transparent material. Both the coated surface S1 and the opposite, uncoated second surface S2 exhibit excessive curvature which, if not properly compensated, can adversely impact both the transmissive and reflective properties of dichroic filter 50. In general, it is most beneficial to have coating 52 as flat as possible; thus, the surface form of dichroic filter 50 does not provide good optical performance.

Figure 4A:
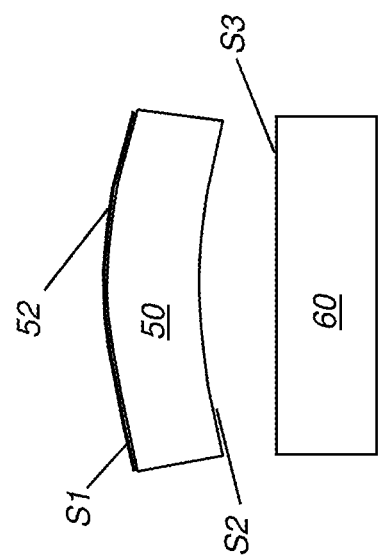
FIG. 4A is a side view showing components of an optical element for modifying the surface form of a dichroic coating.

FIGS. 4A through 4D are side views that show various aspects of forming an optical element with a desired surface form according to an embodiment of the present invention. A second substrate 60 has a third surface S3 with a surface feature that differs from the respective surface features of surfaces S1 and S2. In FIG. 4B, surfaces S2 and S3 are treated or conditioned in some manner for forming a bond between them, as represented by corresponding dotted lines.

Treatment for bonding of surfaces S2 and S3 can be for adhesive-based bonding or for adhesive-free bonding. Optical adhesives can be used, but have a number of inherent disadvantages related to durability and performance; generally, index matching of the adhesive to the optical substrate is an approximation at best. Adhesive-free bonding techniques, on the other hand, are particularly advantaged for optical applications, since they provide a zero bond-line thickness. There are a number of bonding techniques of this type familiar to those skilled in the semiconductor and optical arts, such as those described in U.S. Pat. No. 5,846,638 entitled "Composite Optical and Electro-Optical Devices" to Meissner. Techniques that can be used for adhesive-free bonding of two optical surfaces include lamination, fusion bonding, diffusion bonding, wringing, and contact bonding using mechanical pressure or heat treatment, for example. Still other types of adhesive-free bonding prepare the bonding surfaces with a conditioning fluid or other precursor material, then join the surfaces together under heat or pressure, for example, to provide a bond that is not visibly discernable and that provides excellent light transmission. One type of zero bond-line thickness bonding that uses this approach is taught, for example, in U.S. Pat. No. 6,548,176 entitled "Hydroxide-Catalyzed Bonding" to Gwo.

FIG. 4C shows dichroic filter 50 bonded to second substrate 60 to form an optical element 70, a dichroic beam splitter in this example. As FIG. 4C shows, the original first coated surface S1 (from FIGS. 4A and 4B) is modified as a result, reshaped to form a surface S1', having a different curvature and, more generally, a modified surface form or surface figure from its original surface form prior to bonding.

Figure 4D:
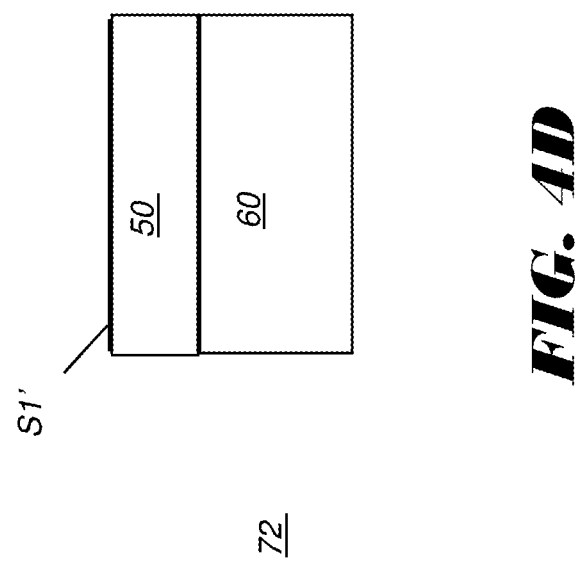
FIG. 4D is a side view that shows an optical element formed by bonding a second substrate to the substrate of the dichroic filter as fabricated, wherein the second substrate is thicker than the first substrate.

FIG. 4C shows optical element 70 having some amount of residual curvature following bonding to a thin substrate 60. By comparison, FIG. 4D shows an optical element 72 with negligible curvature, formed by bonding filter 50 to a thicker substrate 60 with a surface form that is essentially flat.

Unwanted curvature is one factor in determining the surface form or surface figure Zn of an optical surface. For the example of FIGS. 4A-4D, coated surface S1 has a surface form Z1; opposite surface S2 has a surface form Z2; and third surface S3 of the second substrate 60 has a surface form Z3. The modified surface form of surface S1' is Z1'. Using these assigned variable values, the following surface form difference relationship holds:

$$|(Z1'-Z3)|<|(Z1-Z3)| \qquad \text{(rel. 1)}$$

As noted previously with reference to the 3/A(B) surface form notation of ISO 10110-5, the difference value between two surfaces can be obtained either by subtracting their respective "A" values from one another or by subtracting their respective "(B)" values from one another, or by subtracting both respective "A" and "(B)" values from one another. The absolute value of the subtraction provides the magnitude of the difference. For example, where surface S1 in FIG. 4A has a sagitta deviation given as 0.4λ and surface S3 has a sagitta deviation given as 0.1λ, the magnitude of the difference between their surface forms can be computed as 0.3λ. The same subtraction and use of absolute value is used to express the surface irregularity difference between surfaces S1 and S3, generally given as RMS values.

Using an embodiment of the present invention, the surface form for the surface that has the dichroic coating can be favorably modified. This allows thin film fabrication and use on surfaces of various shapes without compromising the advantages of disposing the dichroic coating surface directly in the path of the incident beam and not encased in glass, for example. Using this method, it is possible to improve the flatness of the dichroic surface for a multilayer thin film coating, for example, so that a filter that might otherwise be of standard grade, having a radius of curvature near about 6 m as fabricated, can be upgraded for use in laser-grade or image-grade applications, effectively provided with a radius of curvature of 30 m or 100 m or larger.

Because it allows improvement of both sagitta deviation (A), and surface irregularity (B), the method of the present invention can alternately be used to change the surface form of the as-fabricated dichroic filter in a number of ways. The example sequence shown in FIGS. 5A and 5B shows modification of the original surface form of surface S1 to increase its curvature in forming an optical element 74 for use in both transmission and reflection. A substrate 62 has surface S3 having a given radius of curvature that is greater than the radius of curvature of surface S1, alternately expressed as surface S3 having less curvature that surface S1. Bonding surface S2 to surface S3 modifies the surface form of the dichroic coated surface S1 to provide modified surface S1'. Surface S1' would then exhibit less curvature than the original surface S1 in this example. Using the same surface form variable assignments given previously with reference to FIGS. 4A-4D, the same surface form relationship for magnitude of the difference between respective surface forms holds, that is:

$$|(Z1'-Z3)|<|(Z1-Z3)| \quad \text{(rel. 2)}$$

In an alternate embodiment of the present invention, surface S3 has increased curvature over surface S1. Then, surface S1' after bonding would have increased curvature over that of the initial surface S1.

It can be appreciated that surface irregularity can also be modified using the bonding techniques of the present invention, such as to improve the flatness and reduce surface irregularity for a given coating.

Figure 6B:
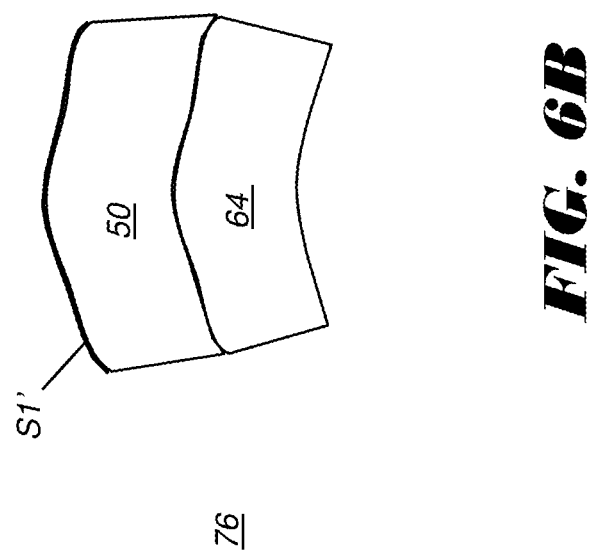
FIG. 6B is a side view that shows an optical element formed by bonding the second substrate of FIG. 6A to the substrate of the dichroic filter as fabricated.

The example sequence of FIGS. 6A and 6B shows modification of the original surface form of surface S1 to provide an optical element 76 that has an aspherical surface S1'. A substrate 64 has surface S3 having aspheric curvature. Bonding surface S2 to surface S3 modifies the surface form of the dichroic coated surface S1 to provide modified surface S1'. Once again, the same surface form relationship given previously in (rel. 1) and (rel. 2) holds.

Figure 7A:
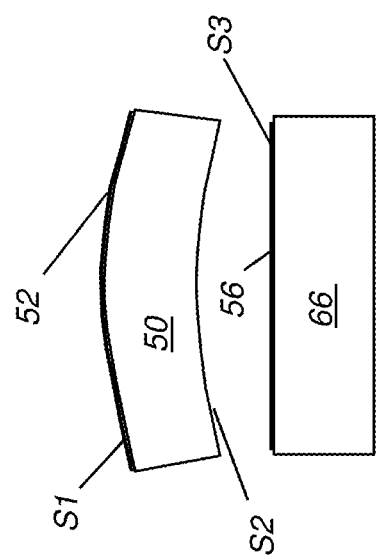
FIG. 7A is a side view showing components of an optical element for modifying the surface form of a dichroic coating, wherein the second substrate has a coated surface.

FIGS. 7A and 7B show an alternate embodiment of the present invention, in which a substrate 66 also has a coating 56 on its surface S3. An optical element 78 having both an external and an encased dichroic coating is formed thereby. Bonding surface S2 to surface S3 modifies the surface form of the dichroic coated surface S1 to provide modified surface S1'. It can also be observed that it is similarly possible to modify the surface form of the encased coating 56 of surface S3 using the sequence shown in FIGS. 7A and 7B.

Figure 7C:
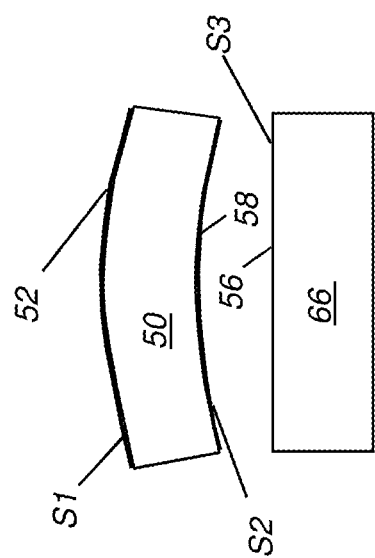
FIG. 7C is a side view that shows an alternate embodiment of an optical element formed by bonding the second substrate of FIG. 7A to the substrate of the dichroic filter as fabricated, with an additional coating added to a second surface of the first substrate.

A number of alternate embodiments are possible, including embodiments in which either or both of surfaces S2 and S3 that are to be bonded together are further conditioned by application of a multilayer coating prior to bonding. FIG. 7C shows application of a coating 58 to surface S2. It should also be noted that surface S4 of substrate 66 can also be coated as shown in FIG. 7B. This can include application of a multilayer thin-film coating such as with an anti-reflection (AR) coating, for example.

Figure 8A:
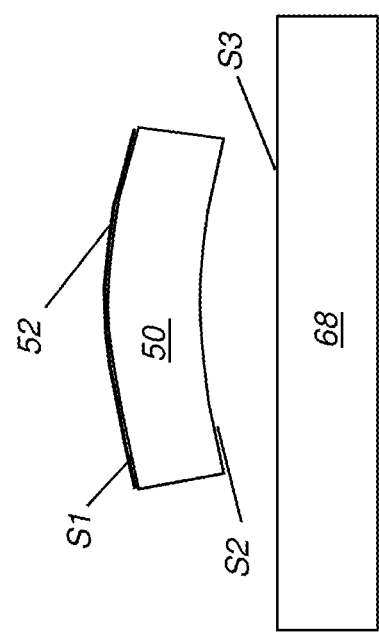
FIG. 8A is a side view showing components of an optical element for modifying the surface form of a dichroic coating, wherein the second substrate has a larger surface area than the first substrate.

According to an alternate embodiment of the present invention, bonding of the dichroic filter to a second substrate can also be used to provide a dichroic surface on only a fractional portion of the surface of the second substrate. FIG. 8A is a side view and FIG. 8B a top view of such an arrangement in which the surface area of surface S3 of a second substrate 68 exceeds the surface area of surface S2 or S1'. The surface area of surface S3 can exceed the surface area of surface S2 or S1' by a percentage, such as by about 0.1%, or 1.0% or 10% or more, for example. Bonding of surface S2 to surface S3 forms an optical element 80 having a portion of its surface as a dichroic surface and, additionally, modifies the surface form of coated surface S1 as described with reference to the preceding examples.

Bonding of surfaces S2 and S3 can be performed using adhesive-free bonding, as noted previously. This type of bonding makes it possible to form a single optical element without the disadvantages of optical adhesives or other methods. In yet another alternate embodiment, direct optical contact is used to provide bonding force, without chemical treatment or adhesive application. Force is provided, for example, against the first surface S1. Any form of adhesive-free bonding can be used, provided that the bond strength is high enough to overcome the initial surface form mismatch between the optical elements in their free state.

It can be noted that there are advantages to bonding a dichroic beamsplitter comprised of a thin-film coating formed on a first substrate to a second substrate as described herein, even when the change of surface form S1 to S1' is quite small or is almost negligible. In particular, in some instances it can be mechanically advantageous to have a thicker substrate that is less susceptible to surface flatness perturbations caused by mounting the dichroic or caused by heat or other factors. In other instances it can be optically advantageous to have a dichroic with a certain overall substrate thickness to achieve a certain imaging performance.

The method of the present invention offers particular advantages for providing optical elements with dichroic surfaces that are used in both transmission and reflection, wherein incident light is directed at an oblique angle. This includes providing dichroic beam splitter devices for optical systems such as that described with reference to FIG. 1, for example. For such applications, it is generally most advantageous to position the dichroic surface directly in the path of incident light, without encasing the coated surface within a prism or plate, such as having the dichroic surface sandwiched between two substrates.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

The invention claimed is:

1. A method for forming an optical element, the method comprising:
    a) depositing a first multilayer thin film coating to form a first coated surface on a first transparent substrate that is substantially flat, wherein, for incident light at an angle of incidence exceeding 5 degrees, the first multilayer thin film coating has a filter characteristic that transmits light of a first wavelength band and reflects light of a second wavelength band, wherein the first coated surface has a first surface form, and wherein the first substrate further has a second surface that is opposite the first coated surface, wherein the second surface has a second surface form after the coating is deposited; and
    b) bonding the second surface of the first substrate to a third surface of a second transparent substrate to form the optical element,
    wherein the third surface has a third surface form prior to bonding and wherein the first coated surface of the optical element has a fourth surface form after bonding,
    wherein the difference between the fourth surface form and the third surface form is less than the difference between the first surface form and the third surface form
    and wherein the difference between the fourth and the third surface forms and between the first and the third surface forms is calculated with respect to sagitta deviation, or with respect to surface irregularity, or with respect to both sagitta deviation and surface irregularity and is expressed as an absolute value.

2. The method of claim 1 further comprising forming a second multilayer thin film coating on the second surface of the first substrate.

3. The method of claim 1 wherein bonding the second surface of the first substrate to the third surface of the second substrate comprises:
    (i) treating the second surface of the first substrate and the third surface of the second substrate for adhesive-free bonding;
    (ii) applying the treated second surface of the first substrate against the treated third surface of the second substrate to bond the second and third surfaces.

4. The method of claim 1 wherein the third surface of the second substrate has a larger radius of curvature than the first surface of the first substrate.

5. The method of claim 1 wherein the third surface of the second substrate has a smaller radius of curvature than the first surface of the first substrate.

6. The method of claim 1 wherein the third surface of the second substrate is aspherical.

7. The method of claim 1 wherein the third surface of the second substrate is plano, convex, or concave.

8. The method of claim 3 wherein applying the treated second surface against the treated third surface further comprises applying a force against the first surface.

9. The method of claim 1 wherein the first substrate is thicker than the second substrate.

10. The method of claim 1 wherein the second substrate is thicker than the first substrate.

11. The method of claim 1 wherein the first and second substrates are formed from the same material.

12. The method of claim 1 wherein the third surface of the second substrate exceeds the second surface of the first substrate in surface area by more than about 10%.

13. The method of claim 1 wherein the first surface form has a first sagitta deviation value that exceeds 2 wavelengths for light of a predetermined wavelength and wherein the third surface form has a second sagitta deviation value that is less than 1 wavelength for light of the predetermined wavelength.

14. The method of claim 1 wherein the difference between the first surface form and the third surface form is less than one wavelength for light of a predetermined wavelength that is transmitted through the optical element.

15. The method of claim 1 wherein the fourth surface form has a sagitta deviation value that is less than one wavelength for light of a predetermined wavelength.

16. The method of claim 1 wherein the formed optical element has a radius of curvature exceeding about 25 meters.

17. A method for forming an optical element, the method comprising:
    a) forming a first multilayer thin film coating on a first surface of a first transparent glass substrate that is substantially flat, wherein the first coating has a filter characteristic that transmits light of a first wavelength band and reflects light of a second wavelength band, wherein the first surface has a first surface form Z1, and wherein the first substrate has a second surface opposite the first surface and having a second surface form Z2; and
    b) bonding the second surface of the first substrate to a third surface of a second transparent glass substrate, wherein the third surface has a third surface form Z3, to form the optical element having a fourth surface form Z1',
    wherein each surface form Z1, Z2, Z3, and Z1' has a corresponding sagitta deviation value and wherein the magnitude of the difference between sagitta deviation values of the fourth surface form Z1' and the third surface form Z3 is less than the magnitude of the difference between the sagitta deviation values of the first surface form Z1 and the third surface form Z3.

18. A method for forming a dichroic beam splitter, the method comprising:
    a) depositing a first multilayer thin film coating to form a first coated surface on a first transparent glass substrate that is substantially flat, wherein, for incident light at an angle of incidence exceeding 5 degrees, the first multilayer thin film coating has a filter characteristic that transmits light of a first wavelength band and reflects light of a second wavelength band, wherein the first coated surface has a first surface form, and wherein the first substrate further has a second surface that is opposite the first coated surface, wherein the second surface has a second surface form after the coating is deposited; and
    b) bonding the second surface of the first substrate to a third surface of a second transparent glass substrate using adhesive-free bonding to form the dichroic beam splitter,
    wherein the third surface has a third surface form prior to bonding and wherein the first coated surface of the beam splitter has a fourth surface form after bonding,
    wherein the difference between the fourth surface form and the third surface form is less than the difference between the first surface form and the third surface form.

19. The method of claim 18 further comprising depositing a second multilayer thin film coating on the second surface of the first transparent glass substrate.

* * * * *